United States Patent
Lee et al.

(10) Patent No.: US 9,489,388 B2
(45) Date of Patent: Nov. 8, 2016

(54) COMPUTING SYSTEM, HOST SYSTEM AND METHOD FOR MANAGING DATA

(71) Applicant: SAMSUNG ELECTRONICS CO., LTD., Suwon-si, Gyeonggi-do (KR)

(72) Inventors: Chang-Man Lee, Seoul (KR); Jae-Geuk Kim, Hwaseong-si (KR); Chul Lee, Suwon-si (KR); Joo-Young Hwang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 253 days.

(21) Appl. No.: 14/038,938

(22) Filed: Sep. 27, 2013

(65) Prior Publication Data

US 2014/0095556 A1    Apr. 3, 2014

(30) Foreign Application Priority Data

Sep. 28, 2012 (KR) .................. 10-2012-0109162

(51) Int. Cl.
    *G06F 12/00*      (2006.01)
    *G06F 17/30*      (2006.01)

(52) U.S. Cl.
    CPC .............................. *G06F 17/30091* (2013.01)

(58) Field of Classification Search
    CPC ............ G06F 17/30067; G06F 3/067; G06F 11/1076; G06F 9/5083; G06F 11/1471; G06F 2211/1028; G06F 3/0631; G06F 17/30156; G06F 3/0689; G06F 17/30215; G06F 3/064; G06F 3/0667; G06F 3/0643; G06F 17/30
    USPC ........... 707/600–831, 899, 999.001–999.206
    See application file for complete search history.

(56) References Cited

U.S. PATENT DOCUMENTS

| | | | |
|---|---|---|---|
| 6,505,217 B1 | 1/2003 | Venkatraman et al. | |
| 6,578,121 B1 | 6/2003 | Schutzman | |
| 6,961,739 B2 | 11/2005 | Lee et al. | |
| 7,159,073 B2 | 1/2007 | Longo et al. | |
| 7,711,916 B2 | 5/2010 | Chandrasekaran et al. | |
| 7,882,300 B2 | 2/2011 | Kim et al. | |
| 7,979,663 B2 | 7/2011 | Tomonaga | |
| 8,204,871 B1 | 6/2012 | Pawar et al. | |
| 8,533,410 B1* | 9/2013 | Corbett | G06F 12/00 707/637 |
| 8,554,745 B2* | 10/2013 | Pawar | G06F 12/0804 707/638 |
| 8,612,382 B1* | 12/2013 | Patel | G06F 11/0727 707/609 |
| 8,954,383 B1* | 2/2015 | Vempati | G06F 17/30088 707/610 |
| 2002/0156840 A1* | 10/2002 | Ulrich | G06F 17/30067 709/203 |
| 2006/0156078 A1 | 7/2006 | Baumhof et al. | |
| 2008/0172428 A1 | 7/2008 | Stokes | |
| 2010/0274773 A1* | 10/2010 | Pawar | G06F 12/0804 707/693 |
| 2011/0078118 A1* | 3/2011 | Kushwah | G06F 11/1451 707/646 |

FOREIGN PATENT DOCUMENTS

JP      07-093192      4/1995

* cited by examiner

*Primary Examiner* — Angelica Ruiz
(74) *Attorney, Agent, or Firm* — Volentine & Whitt, PLLC

(57) ABSTRACT

A computing system includes a storage device in which file data is stored through data blocks and metadata is stored through a node block, and a file system configured to manage the file data and the metadata stored in the storage device. The node block includes data pointers respectively pointing to the data blocks, and one or more extents each indicative of data block groups which include data blocks having continuous physical addresses among the data blocks.

16 Claims, 13 Drawing Sheets

| NODE ID | PHYSICAL ADDRESS |
|---------|------------------|
| N0 | a |
| N1 | b |
| N2 | c |
| ⋮ | |

COMPUTING SYSTEM, HOST SYSTEM AND METHOD FOR MANAGING DATA

CROSS-REFERENCE TO RELATED APPLICATION

A claim of priority is made to Korean Patent Application No. 10-2012-0109162 filed on Sep. 28, 2012, in the Korean Intellectual Property Office, the disclosure of which is incorporated by reference in its entirety.

BACKGROUND

The present inventive concept relates to computing systems and to methods for managing data in computing systems.

When a file system writes a file to a storage device, both file data and metadata are stored in the storage device. The file data includes the content of the file that a user application intends to store. On the other hand, metadata includes non-content data, such as attributes of the file and a position of a block in which the file data is stored. On the other hand, when the file system reads a file from the storage device, the metadata stored in the storage device is read from the storage device and the file data is then read based on the read metadata.

SUMMARY

According to an aspect of the present inventive concept, a computing system is provided which includes a storage device in which file data is stored through data blocks and metadata is stored through a node block, and a file system configured to manage the file data and the metadata stored in the storage device. The node block includes data pointers respectively pointing to the data blocks, and one or more extents each indicative of data block groups which include data blocks having continuous physical addresses among the data blocks.

According to another aspect of the present inventive concept, a host device is provided which includes a storage interface configured to communicate with a storage device, and a file system configured to control the storage device, via the storage interface, such that a file data is stored through data blocks in the storage device and metadata is stored through a node block in the storage device. The block includes the data pointers respectively pointing to the data blocks, and one or more extents each indicative of data block groups which include data blocks having continuous physical addresses among the data blocks.

According to another aspect of the present inventive concept, a method for managing data in a computing system is provided. The method includes creating first data blocks storing a file data, and creating a node block including data pointers respectively pointing to the data blocks, and one or more extents each indicative of data block groups which include data blocks having continuous physical addresses among the data blocks. The number of extents included in the node block is a predetermined number N or less, where N is a natural number smaller than the number of data pointers.

BRIEF DESCRIPTION OF THE DRAWINGS

The above and other aspects and features of the present inventive concept will become apparent from the detailed description that follows, with reference to the accompanying drawings, in which.

DETAILED DESCRIPTION OF THE EMBODIMENTS

Figure 1:
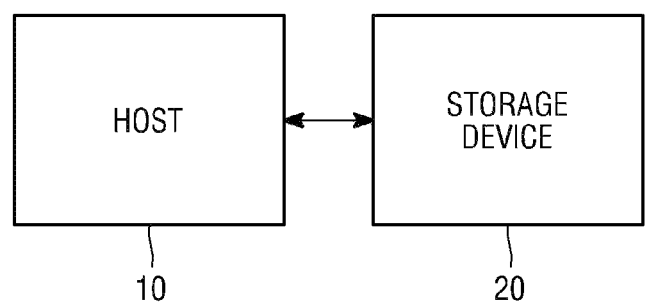
FIG. 1 is a block diagram of a computing system according to an embodiment of the present inventive concept.

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept.

Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

As is traditional in the field of the present inventive concept, embodiments are at least partially described/depicted herein in terms of functional blocks and/or units and/or modules. Unless otherwise stated, it will be understood that these blocks/units/modules may be physically implemented by hard-wired electronic circuits and/or logic circuits, or by processor driven software, or any by a combination thereof. Non-limiting examples include Field Programmable Gate Array (FPGA) or Application Specific Integrated Circuit (ASIC), which performs certain tasks. The blocks/units/module may be configured to reside on the addressable storage medium and configured to execute responsive to one or more processors. Each block/unit/module may, by way of example, be made up of a combination of components, such as software components, object-oriented software components, class components and task components, processes, functions, attributes, procedures, subroutines, segments of program code, drivers, firmware, microcode, circuitry, data, databases, data structures, tables, arrays, and variables. Also, it will be understood that each of the blocks/units/modules described herein may be physically and/or functionally divided into multiple blocks and/or units without departing from the inventive concept. Conversely, two or more blocks and/or units described herein may be physically and/or functionally combined into a single block and/or unit without departing from the inventive concept.

FIG. 1 is a block diagram of a computing system 1 according to an embodiment of the present inventive concept.

Referring to FIG. 1, the computing system 1 according to the current embodiment includes a host device 10 and a storage device 20.

The host device 10 and the storage device 20 exchange data with each other via respective host and storage interfaces, and in accordance with a predetermined interface protocol. As examples, the host device 10 and the storage device 20 may communicate with each other in accordance one or more of a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol. However, the present inventive concept is not limited by the communication protocol(s) between the host device 10 and the storage device 20.

The storage device 20 is operationally controlled by host device 10. For example, the host device 10 may control the writing of data to the storage device 20 and/or the reading of data from the storage device 20.

An example of host device 10 will now be described in greater detail with reference to logical module hierarchy shown in FIG. 2.

Figure 2:
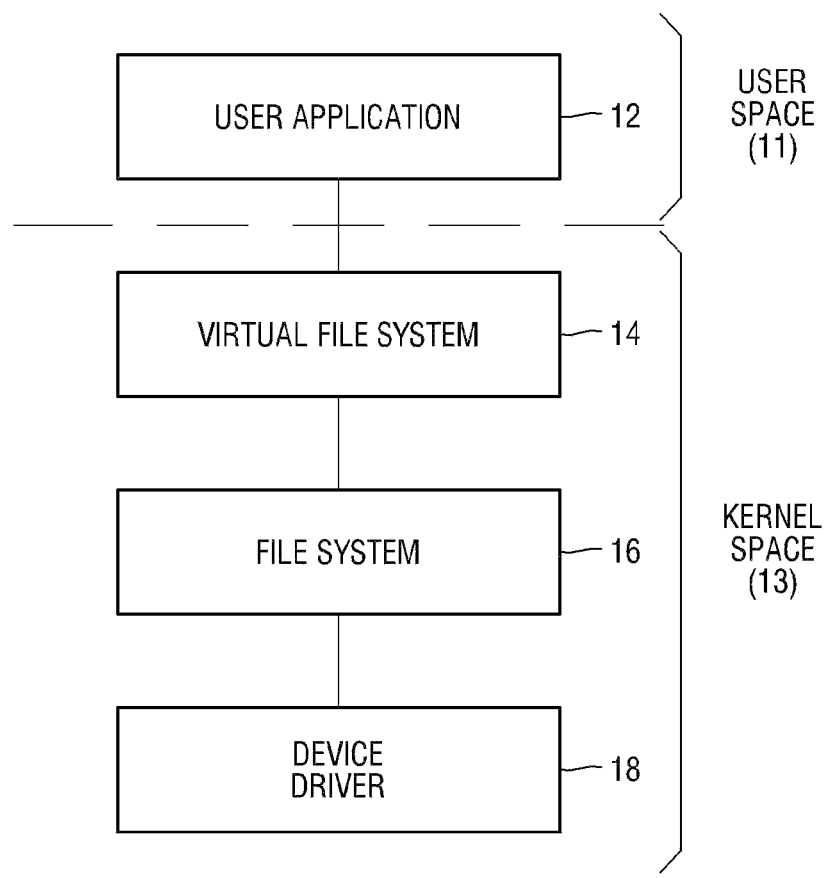
FIG. 2 is a diagram depicting an example of a logical module hierarchy of the host device shown in FIG. 1.

Referring to FIG. 2, the host device 10 generally includes a user space 11 and a kernel space 13.

The user space 11 is an area in which a user application 12 is executed, and the kernel space 13 is an area dedicated to execution of a kernel. The user space 11 may access the kernel space 13 using a system call provided by the kernel.

The kernel space 13 may include a virtual file system 14 which connects an I/O call of the user space 11 to an appropriate file system 16, one or more file systems 16, and a device drive driver 18 which provides a hardware control call for controlling the storage device 20.

The file systems 16 are not limited by type, and a few examples thereof include ext 2, ntfs, smbfs, and proc. In an example embodiment which will be described later, one or more of the file systems 16 is a Flash-Friendly-File-System (F2FS) which is based on a log-structured file system. However, the inventive concepts are not limited F2FS file systems, and other types of file systems may be utilized.

The virtual file system 14 enables the file systems 16 to operate with each other. For a read/write operation on different file systems 16 of different media, the virtual file system 14 enables the use of a standardized system call. For example, the system call such as open( ) read( ) or write( ) can be used regardless of the type of the file systems 16. That is, the virtual file system 14 is a virtual layer existing between the user space 11 and the file systems 16.

The device driver 18 serves as an interface between hardware and a user application (or operating system). The device driver 18 is a program provided for hardware to operate normally on a certain operating system. Also, the storage device 20 of FIG. 1 is not limited by type. Examples include a data server, a card storage device, a solid state drive (SSD), a hard disk drive (HDD), a MultiMediaCard (MMC), an eMMC, and so on.

Figure 3:
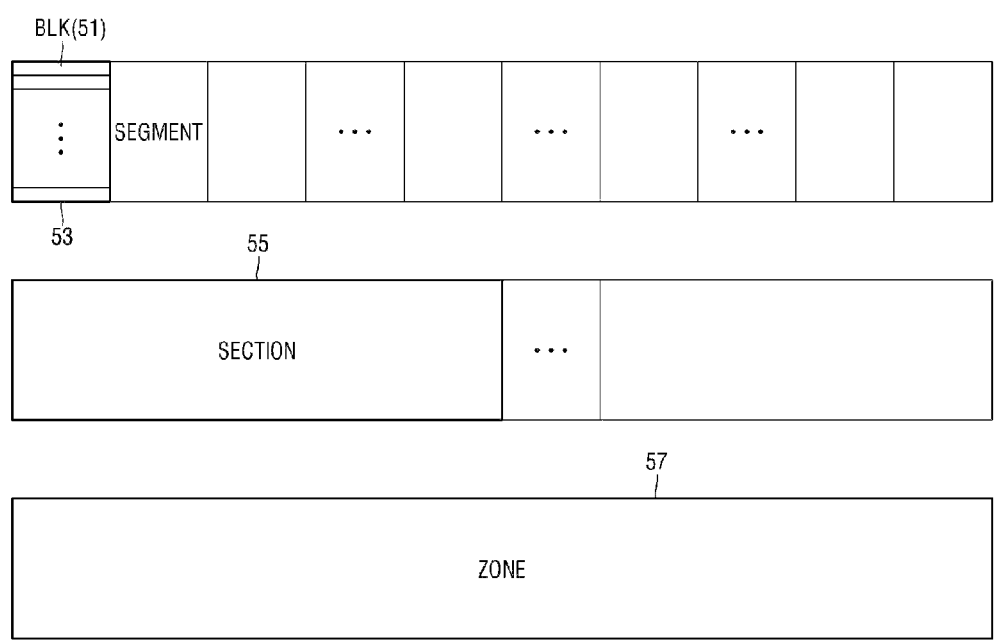
FIG. 3 is a diagram illustrating an example of the configuration of a storage area of a storage device shown in FIG. 1.

FIG. 3 is a diagram illustrating an example of the configuration of data stored in the storage device 20 of FIG. 1.

A segment 53 may include a plurality of blocks 51, a section 55 may include a plurality of segments 53, and a zone 57 may include a plurality of sections 55. For example, a block 51 may be 4 Kbytes, and a segment 53 including 512 blocks 51 may be 2 Mbytes. This configuration may be determined at a time when the storage device 20 is formatted. However, the present inventive concept is not limited thereto. The size of each section 55 and the size of each zone 57 can be modified when the storage device 20 is formatted. In this example, the F2FS file system can read/write all data on a 4 Kbyte page-by-4 Kbyte page basis. That is, one page may be stored in each block 51, and a plurality of pages may be stored in each segment 53.

Figure 4:
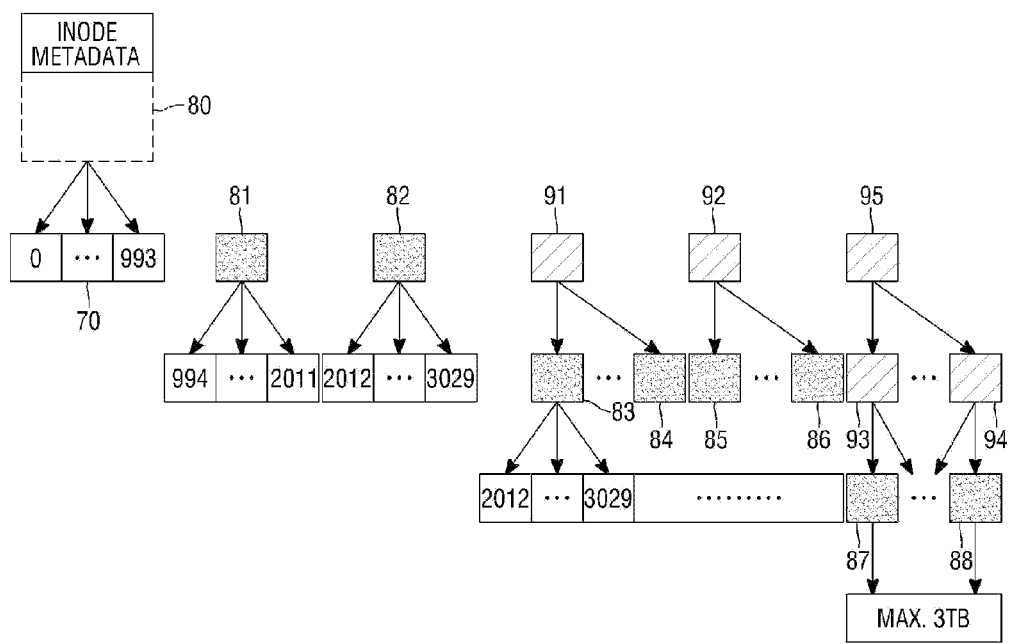
FIG. 4 is a diagram illustrating an example of the structure of a file stored in the storage device of FIG. 1.

A file stored in the storage device 20 may have an indexing structure as shown in FIG. 4.

FIG. 4 is a diagram illustrating an example of the structure of a file stored in the storage device 20 of FIG. 1.

One file may consist of file data and metadata about the file data. Data blocks 70 are where the file data is stored, and node blocks 80, 81 through 88 and 91 through 95 are where the metadata is stored.

The node blocks 80, 81 through 88 and 91 through 95 may include file direct node blocks 81 through 88, file indirect node blocks 91 through 95, and a file inode block 80. In the F2FS file system, one file has one file inode block 80.

Each of the file direct node blocks 81 through 88 includes an ID of the file inode block 80 and a number of data pointers (which directly indicate the data blocks 70) equal to the number of the data blocks 70 which are child nodes of the file direct node block. Each of the file direct node blocks 81 through 88 further stores information about where each data block 70 comes in the file corresponding to the file inode block 80, that is, offset information of each data block 70.

Each of the file indirect node blocks 91 through 95 includes pointers which indicate the file direct node blocks 81 through 88 or other file indirect node blocks 91 through 95. The file indirect node blocks 91 through 95 may include, for example, first file indirect node blocks 91 through 94 and a second file indirect node block 95. The first file indirect node blocks 91 through 94 include first node pointers which indicate the file direct node blocks 83 through 88. The second file indirect node block 95 includes second node pointers which indicate the first file indirect node blocks 93 and 94.

The file inode block 80 may include at least one of data pointers, first node pointers which indicate the file direct node blocks 81 and 82, second node pointers which indicate the first file indirect node blocks 91 and 92, and a third node pointer which indicates the second file indirect node block 95.

In the example of this embodiment, one file may have a maximum of 3 Tbytes, and such a high-volume file may have the following indexing structure. For example, the file inode block 80 may have 994 data pointers, and the 994 data pointers may indicate 994 data blocks 70, respectively. In addition, the file inode block 80 may have two first node pointers, and the two first node pointers may indicate the two file direct node blocks 81 and 82, respectively. The file inode block 80 may have two second node pointers, and the two second node pointers may indicate the two first file indirect node blocks 91 and 92, respectively. The file inode bock 80 may have one third node pointer, and the third node pointer may indicate the second file indirect node block 95. In addition, each file has inode pages including inode metadata.

Figure 5:
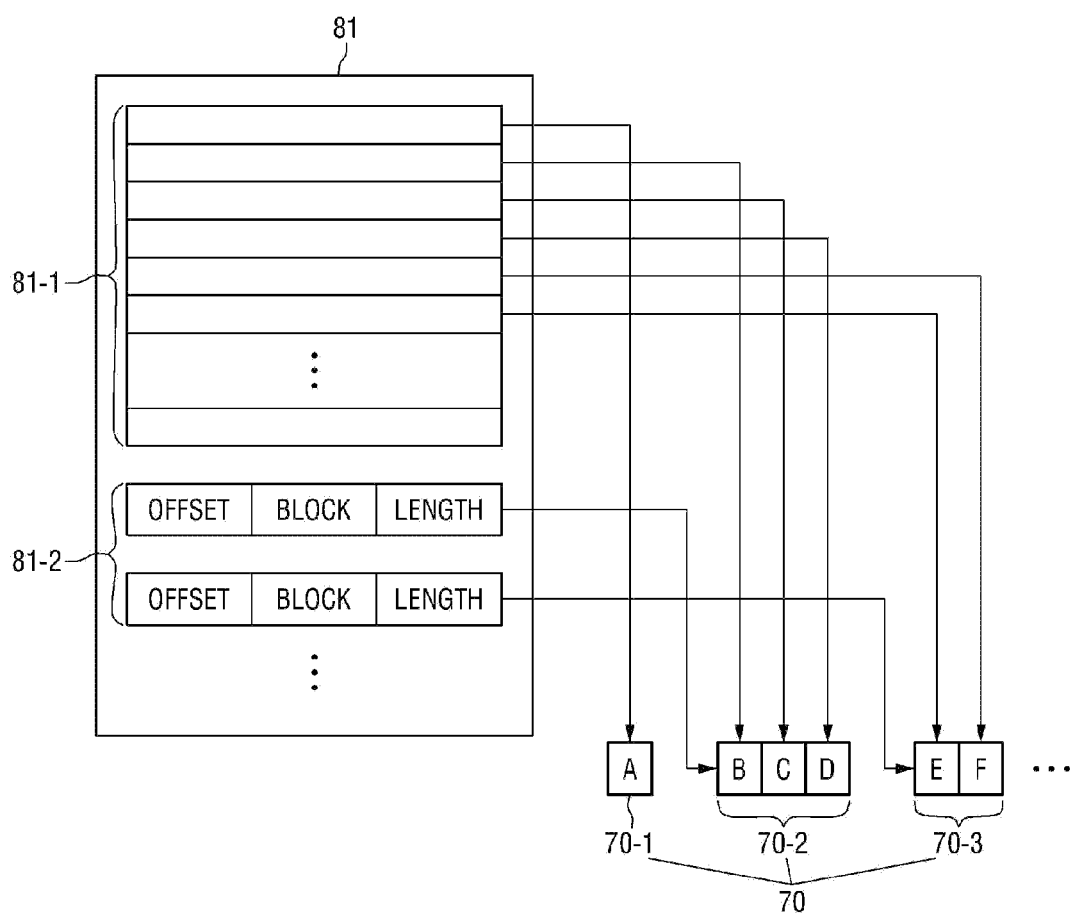
FIG. 5 is a diagram illustrating an example of a direct node block shown in FIG. 4.

FIG. 5 is a diagram illustrating an example of a direct node block shown in FIG. 4.

Referring to FIG. 5, the direct node block 81 includes data pointers 81-1 pointing to the respective data blocks 70, and extents 81-2 grouping and pointing to data blocks 70-2 and 70-3 having continuous physical addresses. Assuming that the file data is ABCDEF, as shown in FIG. 5, for example, the data pointers 81-1 may point to the respective data blocks 70 storing the file data ABCDEF, and the extents 81-2 may point to or indicate the data block or group 70-2 having continuous physical addresses storing data BCD, and the data block or group 70-3 having continuous physical addresses storing data EF.

Meanwhile, as shown in FIG. 5, the respective extents 81-2 may include offset information in the file data of the data stored through the grouped data blocks 70-2 and 70-3, block pointers pointing out the grouped data blocks 70-2 and 70-3, and length information of the grouped data blocks 70-2 and 70-3. In the above-described example, 2 may be stored as the offset information of the extents 81-2 pointing out the grouped data block 70-2 (e.g., in the file data ABCDEF, B has an offset of 2), the data block 70-2 storing B may be pointed out by the block pointer, and 3 may be stored as the length information. In addition, 5 may be stored as the offset information of the extents 81-2 pointing out the grouped data blocks 70-3, the data block 70-2 storing E may be pointed out by the block pointer, and 2 may be stored as the length information.

Here, the number of data pointers 81-1 may be equal to that of data blocks 70 indicated by the direct node block 81. However, the number of extents 81-2 may be smaller than a predetermined number N, where N is a natural number. In some embodiments of the present inventive concept, N may be smaller than the number of data blocks 70 indicated by the direct node block 81. In detail, N may be less than or equal to half of the number of data blocks 70 indicated by the direct node block 81 or the number of data pointers 81-1, but aspects of the present inventive concept are not limited thereto.

The computing system 1 according to the embodiment of the present inventive concept can improve data processing performance by making both of the data pointers 81-1 and the extents 81-2 included in the direct node block 81, and further by controlling the number of extents 81-2 to be N or less, which will be described later in more detail.

Figures 6, 7:
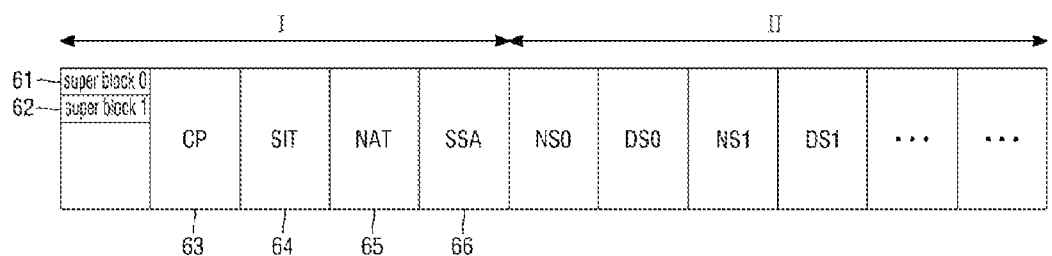
FIG. 6 is a block diagram illustrating an example of a storage configuration of the storage device shown in FIG. 1.
FIG. 7 illustrates an example of a node address table.

FIG. 6 is a block diagram illustrating an example of a storage configuration of the storage device shown in FIG. 1.

As shown in FIG. 6, the storage device 20 may be divided into a first area I and a second area II. This division of the storage device 20 into the first area I and a second area II may occur when formatting the file system 16, but aspects of the present inventive concept are not limited thereto.

The first area I is an area in which various kinds of information managed by the overall system are stored, and may include, for example, the number of currently allocated files, the number of valid pages, position information, etc. The second area II is a space in which various kinds of directory information actually used by users, data, file information, etc. are contained.

The first area I may be stored in a head part of the storage device 20 and the second area II may be stored in a tail part of the storage device 20. Here, the head part may be positioned ahead of the tail part in terms of physical addresses.

In detail, the first area I may include super blocks 61 and 62, a CheckPoint area (CP) 63, a segment information table (SIT) 64, a node address table (NAT) 65, and a segment summary area (SSA) 66.

First, default information of the file system 16 is stored in the super blocks 61 and 62. For example, sizes of blocks 51, the number of blocks 51, state flags of the file system 16 (e.g., clean, stable, active, logging, unknown, etc.) may be stored in the super blocks 61 and 62. As shown, the number of super blocks 61 and 62 may be 2, in which the same content may be stored. Therefore, even if failure is caused to one of the super blocks 61 and 62, the other may be used.

A checkpoint is stored in the CheckPoint area (CP) 63. The checkpoint is a logical interruption point, and states up to the interruption point are perfectly preserved. If an accident (for example, a sudden power off) occurs during the operation of a computing system, the file system 16 may store data using the preserved checkpoint. The checkpoint may be generated periodically or at the time of system shutdown, but aspects of the present inventive concept are not limited thereto.

As shown in FIG. 7, the NAT 65 may include a plurality of node identifiers NODE IDs corresponding to nodes, and a plurality of physical addresses corresponding to the plurality of node identifier node identifiers NODE IDs, respectively. For example, a node block corresponding to node identifier N0 may correspond to physical address a, a node block corresponding to node identifier N1 may correspond to physical address b, and a node block corresponding to node identifier N2 may correspond to physical address c. All nodes, including inode, direct nodes, indirect nodes, etc., have intrinsic node identifiers. In other words, intrinsic node identifiers may be allocated to all nodes (inode, direct nodes, indirect nodes, etc.) from the NAT 65. The NAT 65 may include node identifiers of inode, direct nodes and indirect nodes. Various physical addresses corresponding to the respective node identifiers may be updated.

The SIT 64 includes the number of valid pages of each segment and a bitmap of multiple pages. The bitmap is configured of 0's or 1's, where each bit indicates whether each corresponding page is valid or not. The SIT 64 may be used in a cleaning operation (or garbage collection). In particular, when the cleaning operation is performed, the bitmap may avoid execution of an unnecessary read request. In addition, the bitmap may be used when blocks are allocated in adaptive data logging.

The SSA 66 is a collection area in which various kinds of summary information of each segment are contained in the second area II. In detail, the SSA 66 describes node information for a plurality of blocks of each segment in the second area II. The SSA 66 may be used in the cleaning operation (or garbage collection). In detail, in order to identify locations of data blocks 70 or low-level node blocks (e.g., direct node blocks), the node blocks 80, 81 to 88, and 91 to 95 include a list or address of node identifiers. Conversely, the SSA 66 provides references by which the data blocks 70 or low-level node blocks 80, 81 to 88 and 91 to 95 can identify positions of high-level node blocks 80, 81 to 88 and 91 to 95. The SSA 66 includes a plurality of segment summary blocks. One segment summary block contains information concerning one segment positioned in the second area II. In addition, the segment summary block is composed of multiple pieces of summary information, and one piece of summary information corresponds to one data block or one node block.

The second area II may include data segments DS0 and DS1 separated from each other and node segments NS0 and NS1. A plurality of pieces of data are stored in the data segments DS0 and DS1, and a plurality of nodes may be stored in the node segments NS0 and NS1. If the data and nodes are separated at different regions, the segments can be efficiently managed and the data can be effectively read within a short time when the data is read.

The second area II may be an area in which a write operation is performed by a sequential access method, and the first area I may be an area in which a write operation is performed by a random access method. As mentioned previously, second area II may be stored in a tail part of the storage device 20 and the first area I may be stored in a head part of the storage device 20, where the head part is positioned ahead of the tail part in terms of physical addresses.

When the storage device 20 is the example of a solid state drive (SSD), a buffer may be provided in the SSD. The buffer may be, for example, a single layer cell (SLC) memory having a fast read/write operation speed. Therefore, the buffer may speed up a write operation based on the random access method in a limited space.

In the example given above, the first area I is configured with the super blocks 61 and 62, CP 63, SIT 64, NAT 65 and SSA 66 in that order, but aspects of the present inventive concept are not limited to any particular order. For example, locations of SIT 64 and NAT 65 may be reversed, and locations of NAT 65 and SSA 66 may also be reversed.

Next, a data management method of the computing system according to an embodiment of the present inventive concept will be described with reference to FIGS. 8 to 10.

Figure 8:
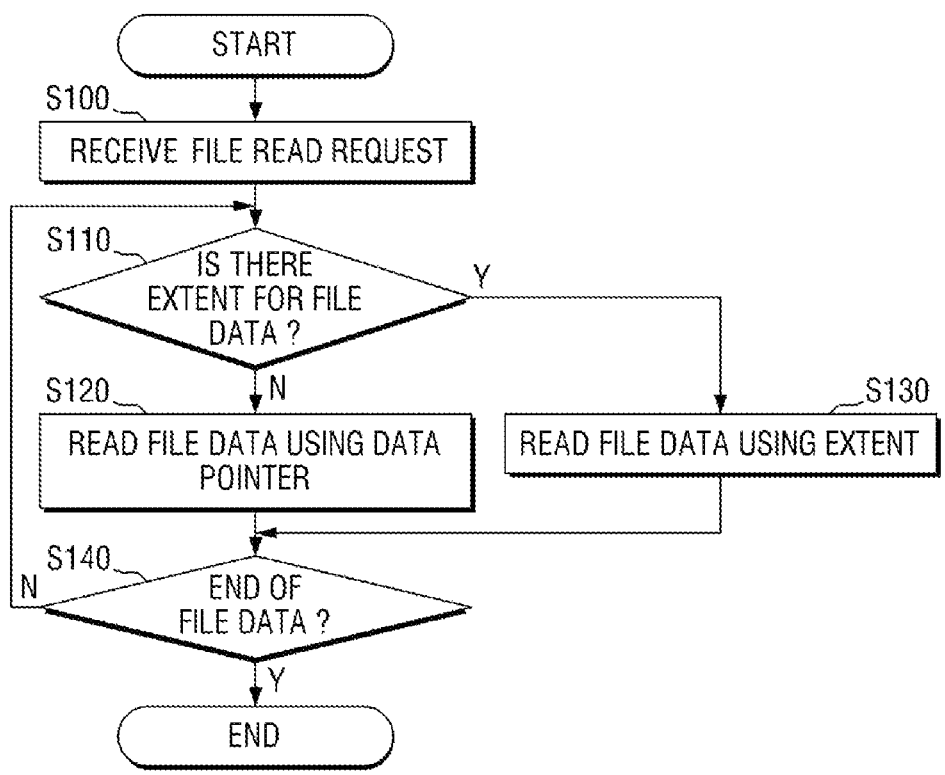
FIG. 8 is a flowchart for reference in describing a data read method of a computing system according to an embodiment of the present inventive concept.

FIG. 8 is a flowchart for reference in describing a data read method of a computing system according to an embodiment of the present inventive concept.

Referring to FIG. 8, a file read request is received (S100). For example, a virtual file system (14 of FIG. 2) or a file system (16 of FIG. 2) may receive a request for a file read from a user application (12 of FIG. 2).

Next, as shown in FIG. 8, in order to read file data, it is checked whether there is an extent for file data (S110). If there is no extent for file data, the file data is read using a data pointer (S120). However, if there is an extent for file data, the file data is read using the extent (S130). Then, it is checked whether the data read using the data pointer or the extent is the end of file data or not (S140). If not, the steps S110 to S130 are repeated, and if yes, the read operation is finished.

Hereinafter, for a better understanding of the inventive concept, a data read method of a computing system according to an embodiment of the present inventive concept will be described in more detail using the example embodiment illustrated in FIG. 5. The notations (S . . . ) refer to corresponding operation of FIG. 8.

First, in the example embodiment illustrated in FIG. 5, file data A has no extents 81-2 referencing the same (S110). Therefore, the file data A is read by referencing data pointers 81-1 (S120). Since all of the file data are yet to read, the read operation is continuously performed (S130).

Next, file data B has extents 81-2 referencing the same (S110). Therefore, the file data B is read by referencing the extents 81-2 (S130). Here, when file data is read using the extents 81-2 referencing the file data B, file data BCD are read at once. Since all of the file data are yet to read, the read operation is continuously performed (S130).

Next, file data E also has extents 81-2 referencing the same (S110). Therefore, the file data E is read by referencing the extents 81-2 (S130). Here, when file data is read using the extents 81-2 referencing the file data E, file data EF can be read. Now that all of file data are read, the read operation is finished (S130).

As described above, in the computing system 1 according to the embodiment of the present inventive concept, since the extents 81-2 are also included in the direct node block 81 or the inode block 80 together with the data pointers 81-1, a data read time can be reduced, compared to a case in which data is read using only the data pointers 81-1. Here, as a larger amount of file data is pointed by one extent 81-2 (that is, as the number of data blocks 70 is increased), a data read time can be further reduced.

Meanwhile, unlike in FIG. 5, if all of the file data stored in the storage device 20 are distributed and stored in a data block (e.g., data block 70-1) having physically discontinuous addresses, the number of data pointers 81-1 and the number of extents 81-2 may become equal to the number of data nodes 70 in the worst case. In this case, the additional extents 81-2 may give rise to squandering of a storage space.

Therefore, in the computing system 1 according to an embodiment of the present inventive concept, the number of extents 81-2 is managed to be a predetermined number N or less. By doing so, a data read time can be reduced by the read operation using the extents 81-2 while preventing a storage space from being wasted.

Hereinafter, a data write method of a computing system according to an embodiment of the present inventive concept will be described with reference to FIGS. 9 and 10.

Figure 9:
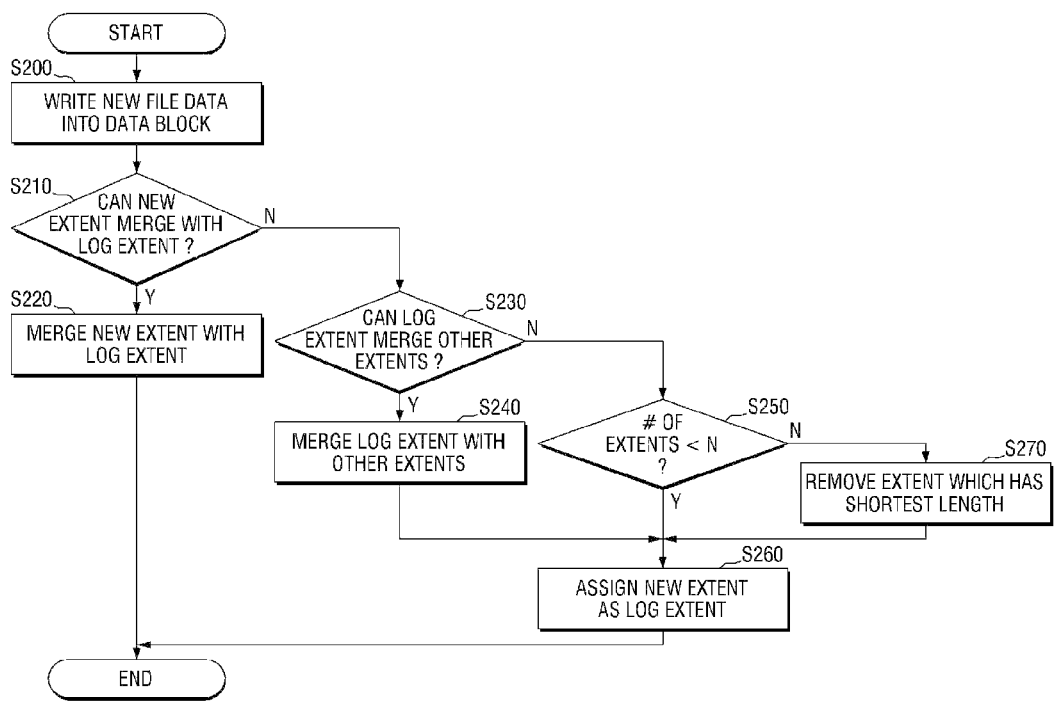
FIG. 9 is a flowchart for reference in describing a data write method of a computing system according to an embodiment of the present inventive concept.
Figure 10:
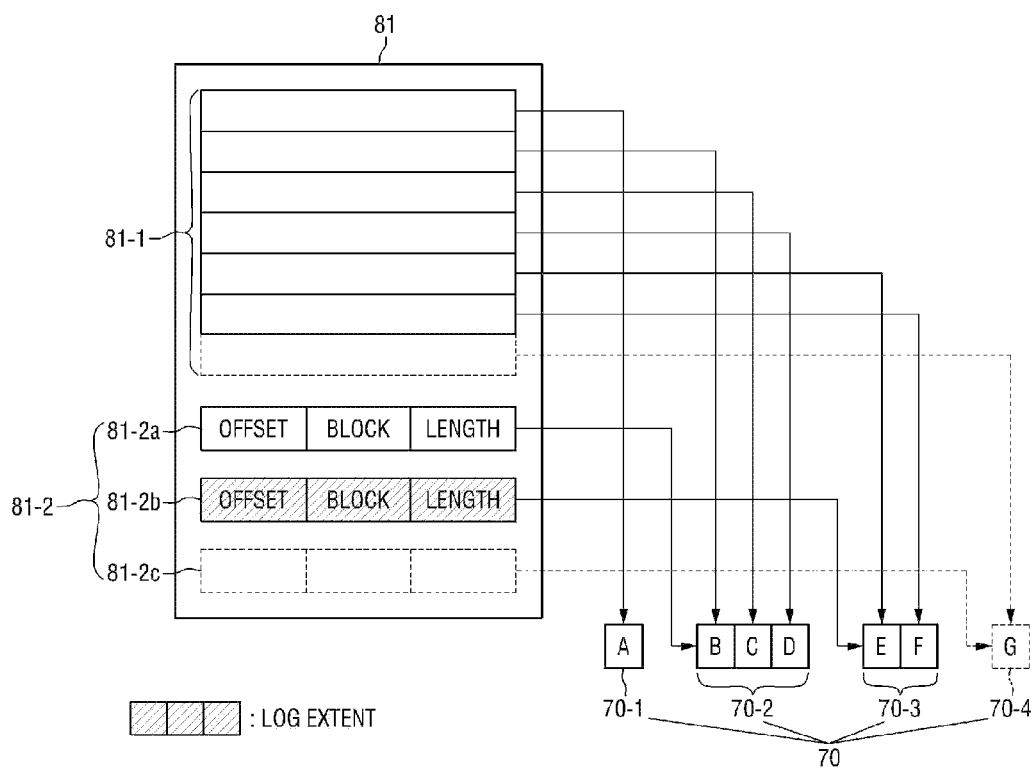
FIG. 10 is diagram for reference in describing a specific example of the data write method of FIG. 9.

FIG. 9 is a flowchart for reference in describing a data write method of a computing system according to an embodiment of the present inventive concept, and FIG. 10 illustrates a specific example of the data write method shown in FIG. 9.

Referring to FIG. 9, new file data is written into a data block (S200). Here, for a better understanding of the inventive concept, an exemplary write operation will be described with regard to a case in which file data G is additionally written into the file data ABCDEF (see FIG. 5). If the file data G is added in such a way, a new data block 70-4 shown in FIG. 10 is allocated and a data pointer 81-1 pointing out the new data block 70-4 is created.

Referring again to FIG. 9, it is determined whether the new extent pointing out the new data block can be merged with a log extent or not (S210). If it is determined that the new extent can be merged with the log extent, the new extent is merged with the log extent (S220). In detail, referring to FIG. 10, a log extent 81-2b means an extent pointing out the most recently added file data. In the example embodiment illustrated in FIG. 10, it is determined whether an extent 81-2c can be merged with a log extent 81-2b or not. If a physical address of a data block 70-4 is arranged to be continuous to that of the data block 70-3, the new extent 81-2c can be merged with the log extent 81-2b. Therefore, the new extent 81-2c is merged with the log extent 81-2b. If the two extents 81-2b and 81-2c are merged, length information of the log extent 81-2b is increased to 3, and the number of all extents in the node block 81 can be maintained to be 2, like in a case in which the file data G is not added.

Referring again to FIG. 9, if it is determined that the new extent cannot be merged with the log extent, it is determined whether other extents can be merged with the log extent or not (S230). If yes, the other extents are merged with the log extent (S240). Then, the new extent is assigned as the log extent (S250).

In detail, in the example embodiment illustrated in FIG. 10, if the physical address of the data block 70-4 is not arranged to be continuous to that of the data block 70-3 and the new extent 81-2c cannot be merged with the log extent 81-2b, it is determined whether other extents 81-2a can be merged with the log extent 81-2b. Since file data is continuously updated, storing physical addresses of the data blocks 70-2 and 70-3 storing the file data can be continuously changed. Therefore, there may be an extent 81-2, which could not be merged when the extent 81-2 was initially created but can later be merged when data is updated. In this embodiment, a physical address of the data blocks 70-2 storing the file data BCD is compared with a physical address of the data blocks 70-3 storing the file data EF to determine whether the log extent 81-2b and the existing extent 81-2a can be merged or not. As the comparison result, if it is determined that the log extent 81-2b and the existing extent 81-2a can be merged, the log extent 81-2b is merged with the existing extent 81-2a. As the result, length information of the existing extent 81-2a will be increased to 5. Thereafter, the new extent 81-2c is allocated as the log extent 81-2b. In this case, the number of all extents can be maintained to be 2, like in a case in which the file data G is not added.

Referring again to FIG. 9, if it is determined that the log extent and other extents cannot be merged, it is determined whether the number of all extents included in the node block is smaller than a predetermined number N (S260). As the result, if it is determined that the number of all extents included in the node block is smaller than N, a new extent is allocated as the log extent (S250). However, if it is determined that the number of all extents included in the node block is greater than or equal to N, the extent having the shortest length is removed (S270) and the new extent is allocated as the log extent (S250).

That is to say, in this embodiment, if the number of all extents 81-2 included in the node block 81 becomes smaller than or equal to N as the new extent 81-2c shown in FIG. 10 is added, the new extent 81-2c is allocated as the log extent 81-2b. However, if the number of all extents 81-2 included in the node block 81 exceeds N, the extent having the shortest length (e.g., extent 81-2b in FIG. 10) may be removed, and the new extent 81-2c may be allocated as the log extent 81-2b, thereby maintaining the number of all extents 81-2 to be the predetermined number N or less.

Meanwhile, in some embodiments of the present inventive concept, the predetermined number N may be less than or equal to half of the number of data blocks 70 pointed by the node block 81 or the number of data pointers 81-1. If the number of extents 81-2 included in the node block 81 is limited in such a manner, the extents 81-2 are used, thereby avoiding unnecessary squandering of a storage space.

Figure 11:
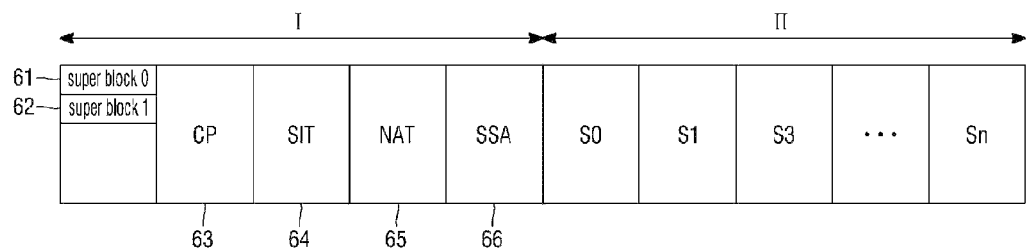
FIGS. 11, 12 and 13 are block diagrams illustrating examples of the storage device shown in FIG. 6.
Figure 12:
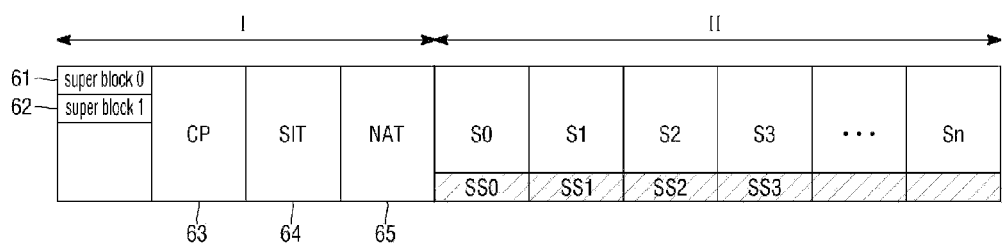
Figure 13:
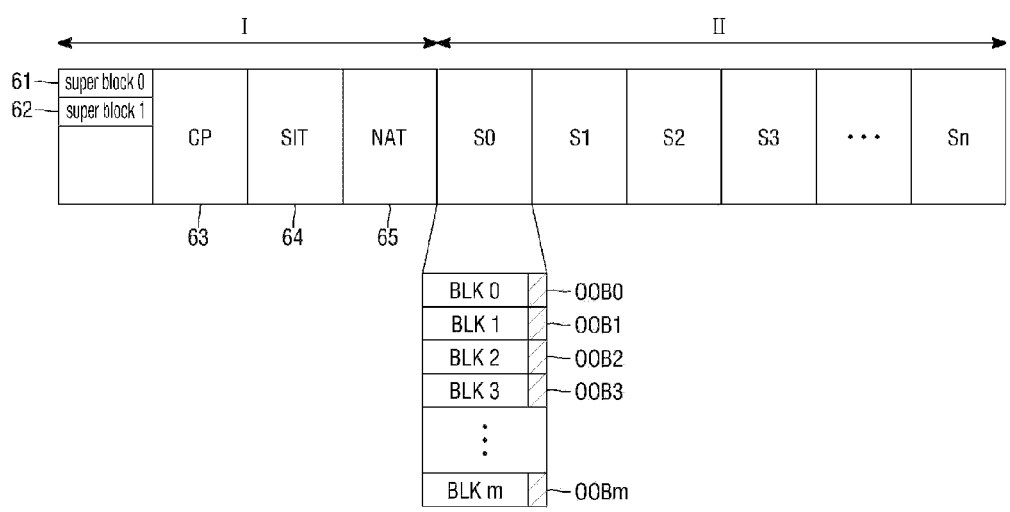

FIGS. 11 to 13 are block diagrams for explaining various examples of configuring the storage device shown in FIG. 6.

For brevity, the following description will focus on differences from the previous embodiment shown in FIG. 6.

Referring to FIG. 11, in the storage device of the computing system according to another embodiment of the present inventive concept, the second area II may include a plurality of segments S1 to Sn separated from each other, where n is a natural number. Both data and nodes may be stored in the respective segments S1 to Sn.

Meanwhile, in the computing system according to another embodiment of the present inventive concept, the storage device includes data segments DS0 and DS1 separated from each other and node segments NS0 and NS1. A plurality of pieces of data are stored in the data segments DS0 and DS1, and a plurality of nodes may be stored in the node segments NS0 and NS1. This is described previously in connection with FIG. 6.

Referring to FIG. 12, in the storage device of the computing system according to still another embodiment of the present inventive concept, a first area I does not include a segment summary area (SSA) (66 of FIG. 6). That is to say, the first area I includes super blocks 61 and 62, a checkpoint area (CP) 62, segment information table (SIT) 64, and a node address table (NAT) 65. In this case, segment summary information may be stored in a second area II. In detail, the second area II includes a plurality of segments S0 to Sn, and the respective segments S0 to Sn are divided into a plurality of blocks. The segment summary information may be stored in at least one of blocks SS0 to SSn of the respective segments S0 to Sn.

Referring to FIG. 13, in the storage device of the computing system according to still another embodiment of the present inventive concept, a first area I does not include a segment summary area (SSA) (66 of FIG. 6). That is to say, the first area I includes super blocks 61 and 62, a checkpoint (CP) area 63, segment information table (SIT) 64, and a node address table (NAT) 65. In this example, segment summary information may be stored in a second area II. In detail, the second area II includes a plurality of segments 53, and the respective segments 53 are divided into a plurality of blocks BLK0 to BLKm, and the respective blocks BLK0 to BLKm may include Out Of Bands (OOBs) OOB0 to OOBm, where m is a natural number. The segment summary information may be stored in the OOB area, where m is a natural number. The segment summary information may be stored in the OOB area OOB0 to OOBm.

Hereinafter, a specific example of a computing system according to some embodiments of the present inventive concept will be described, but the following system is provided only for illustration, but aspects of the present inventive concept are not limited thereto.

Figure 14:
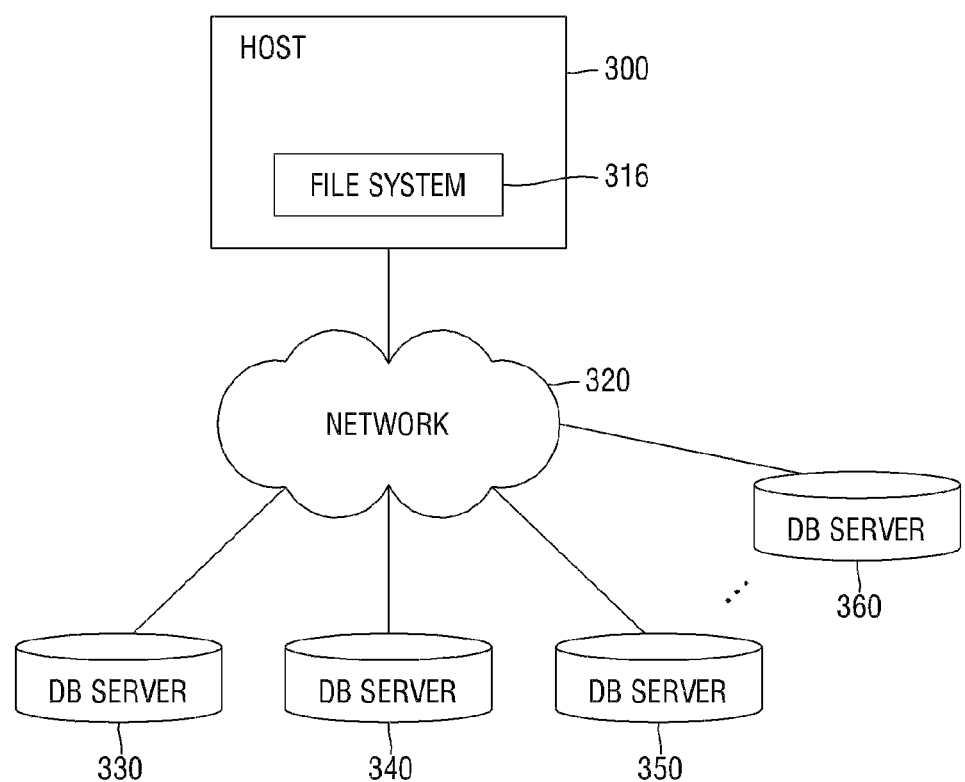
FIG. 14 is a block diagram illustrating an example of a computing system adopting one or more embodiments of the present inventive concept.

FIG. 14 is a block diagram of an example of a computing system adopting one or more embodiments of the present inventive concept.

Referring to FIG. 14, a host server 300 is connected to a plurality of DB servers 330 through 360 through a network 320. In the host server 300, a file system 316 for managing data of the DB servers 330 through 360 may be installed. The file system 316 may be any one of the file systems described above with reference to FIGS. 1 through 13.

Figure 15:
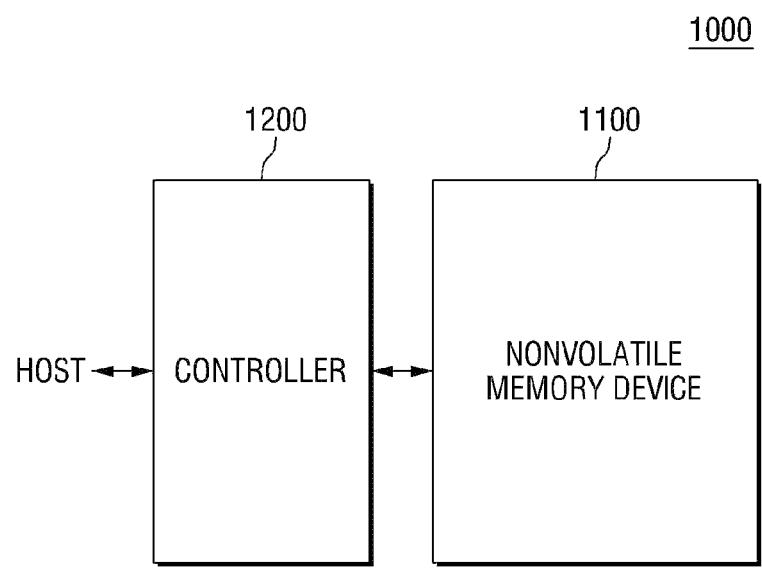
FIGS. 15, 16 and 17 are block diagrams illustrating other examples of computing system adopting one or more embodiments of the present inventive concept.
Figure 16:
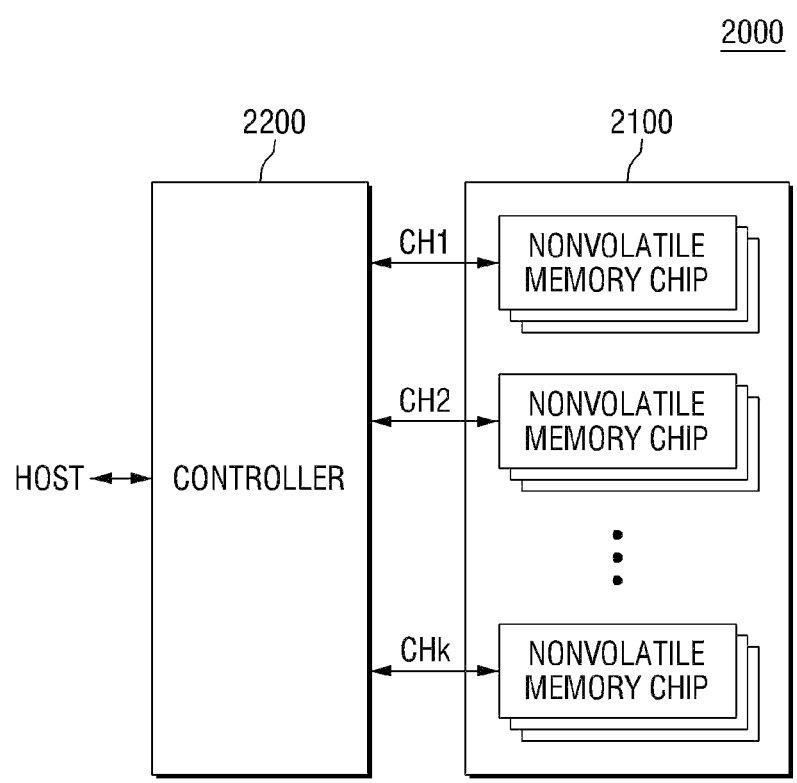
Figure 17:
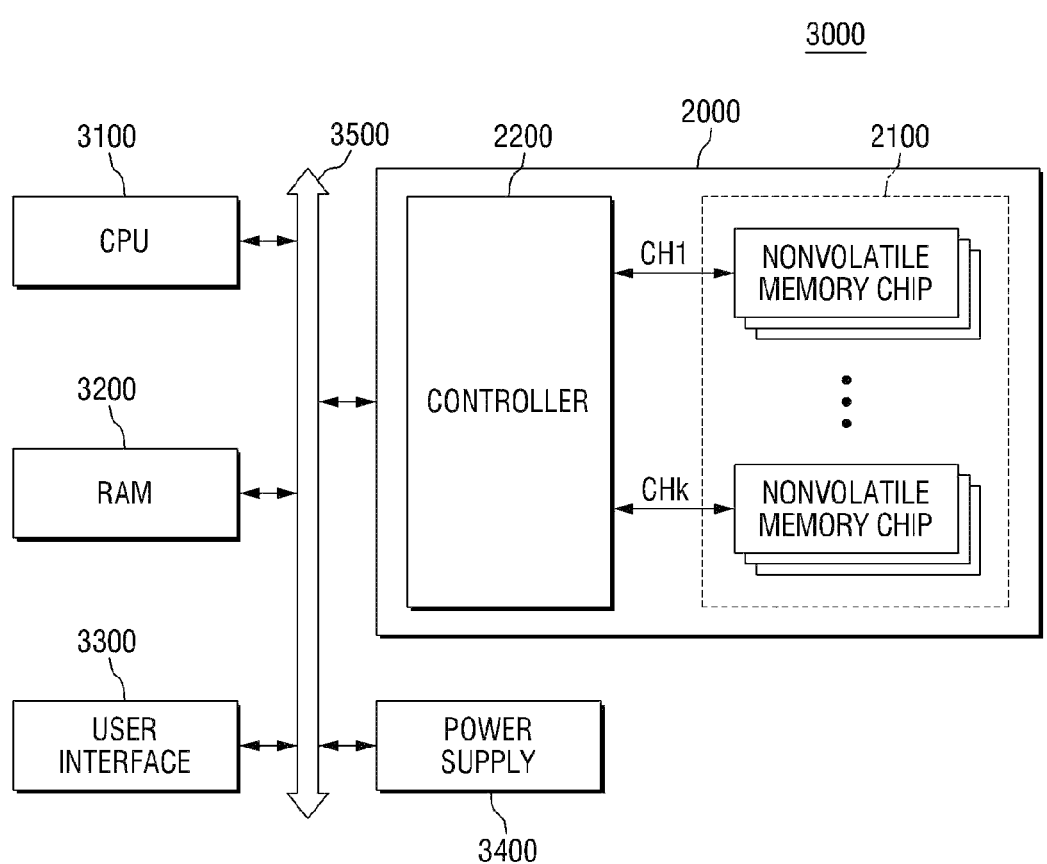

FIGS. 15 through 17 are block diagrams of specific other examples of computing systems adopting one or more embodiments of the present inventive concept.

Referring to FIG. 15, a storage system 1000 (corresponding to 20 in FIG. 1) may include a nonvolatile memory device 1100 and a controller 1200.

The super blocks 61 and 62, the CP area 63, the SIT 64, and the NAT 65 described above may be stored in the nonvolatile memory device 1100.

The controller 1200 is connected to a host and the nonvolatile memory device 1100. The controller 1200 is configured to access the nonvolatile memory device 1100 in response to a request from the host. For example, the controller 1200 may be configured to control read, write, erase and background operations of the nonvolatile memory device 1100. The controller 1200 may be configured to provide an interface between the nonvolatile memory device 1100 and the host. The controller 1200 may be configured to drive firmware for controlling the nonvolatile memory device 1100.

The controller 1200 further includes well-known components such as a random access memory (RAM), a processing unit, a host interface, and a memory interface. The RAM is used as at least one of an operation memory of the processing unit, a cache memory between the nonvolatile memory deice 1100 and the host, and a buffer memory between the nonvolatile memory device 1100 and the host. The processing unit controls the overall operation of the controller 1200.

The controller 1200 and the nonvolatile memory device 1100 may be integrated into one semiconductor device. As an example, the controller 1200 and the nonvolatile memory device 1100 may be integrated into one semiconductor device to comprise a memory card. For example, the controller 1200 and the nonvolatile memory device 1100 may be integrated into one semiconductor device to comprise a memory card such as a personal computer (PC) card (e.g., Personal Computer Memory Card International Association (PCMCIA)), a compact flash card (CF), a smart media card (SM, SMC), a memory stick, a multimedia card (e.g., MMC, RS-MMC, MMCmicro), a SD card (e.g., SD, miniSD, microSD, SDHC), or a universal flash storage (UFS).

As another example, the controller 1200 and the nonvolatile memory device 1100 may be integrated into one semiconductor device to comprise a solid state drive (SSD). The SSD includes a storage device which stores data in a semiconductor memory. When the system 1000 is used as an SSD, the operation speed of the host connected to the system 1000 may increase significantly.

As another example, the system 1000 may be applicable to computers, ultra-mobile PCs (UMPCs), workstations, net-books, personal digital assistants (PDAs), portable computers, web tablets, wireless phones, mobile phones, smart phones, e-books, portable multimedia players (PMPs), portable game devices, navigation devices, black boxes, digital cameras, three-dimensional televisions, digital audio recorders, digital audio players, digital picture recorders, digital picture players, digital video recorders, digital video players, devices capable of transmitting/receiving information in wireless environments, one of various electronic devices constituting a home network, one of various electronic devices constituting a computer network, one of various electronic devices constituting a telematics network, a radio frequency identification (RFID) device, or one of various components constituting a computing system.

As another example, the nonvolatile memory device 1100 or the system 1000 may be packaged according to any of various packaging technologies. Examples of package technologies that may include the nonvolatile memory device 1100 or the system 1000 include Package on Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), Thin Quad Flat Pack (TQFP), System In Package (SIP), Multi Chip Package (MCP), Wafer-level Fabricated Package (WFP), and Wafer-level Processed Stack Package (WSP).

Referring to FIG. 16, a system 2000 includes a nonvolatile memory device 2100 and a controller 2200. The nonvolatile memory device 2100 includes a plurality of nonvolatile memory chips. The nonvolatile memory chips form multiple memory chip groups. Each of the memory chip groups has a common channel for communication with the controller 2200. For example, in FIG. 16, the nonvolatile memory chips communicate with the controller 2200 through first through $k^{th}$ channels CH1 through CHk.

In FIG. 16, a plurality of nonvolatile memory chips are connected to one channel. However, the system 2000 can be modified such that one nonvolatile memory chip is connected to one channel.

Referring to FIG. 17, a system 3000 includes a central processing unit (CPU) 3100, a RAM 3200, a user interface 3300, a power supply 3400, and the system 2000 of FIG. 16.

The system 2000 is electrically connected to the CPU 3100, the RAM 3200, the user interface 3300, and the power supply 3400 through a system bus 3500. Data, which are provided through the user interface 3300 or processed by the CPU 3100, are stored in the system 2000.

In FIG. 17, the nonvolatile memory device 2100 is connected to the system bus 3500 through the controller 2200. However, the nonvolatile memory device 2100 can also be connected directly to the system bus 3500.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the inventive concept.

What is claimed is:

1. A computing system comprising:
    a storage device in which file data is stored through data blocks and metadata is stored through node blocks; and
    a file system configured to manage the file data and the metadata stored in the storage device,
    wherein the node blocks include data pointers respectively pointing to the data blocks, and one or more extents each indicative of data block groups which include data blocks having continuous physical addresses among the data blocks, and
    wherein a number of extents included in the node blocks is a predetermined number N that is less than or equal to half of a number of the data pointers.

2. The computing system of claim 1, wherein each of the one or more extents includes offset information indicative of a first block of a corresponding data block group among the data blocks of the file data, a block pointer pointing to the corresponding data block group, and length information of the corresponding data block group.

3. The computing system of claim 1, wherein the node blocks include direct node blocks pointing to the data blocks, indirect node blocks pointing to the direct node blocks, and an inode block pointing to the direct node blocks and the indirect node blocks, and
    wherein the one or more extents are included in the inode block or the direct node blocks.

4. The computing system of claim 1, wherein when the file data is read from the storage device, the file system reads the file data by referencing the one or more extents first among the data pointers and the one or more extents.

5. The computing system of claim 1, wherein the storage device includes a first area written by a random access method, and a second area written by a sequential access method, and
    wherein the data blocks and the node blocks are stored in the second area.

6. The computing system of claim 5, wherein in the storage device, a physical address of the first area precedes a physical address of the second area.

7. The computing system of claim 5, wherein a node address table is stored in the first area, the node address table including a node identifier corresponding to the node blocks and a physical address corresponding to the node identifier.

8. The computing system of claim 1, wherein the storage device includes a solid state drive (SSD).

9. The computing system of claim 1, wherein the storage device includes a memory controller and a non-volatile memory, and wherein the file system is contained in a host device communicating with the memory controller.

10. The computing system of claim 9, wherein the non-volatile memory includes a plurality of memory chips communicating with the memory controller over respective channels.

11. A host device, comprising:
    a storage interface configured to communicate with a storage device; and
    a file system configured to control the storage device, via the storage interface, to store a file data through data blocks in the storage device and to store metadata through node blocks in the storage device,
    wherein the node blocks include data pointers respectively pointing to the data blocks, and one or more extents each indicative of data block groups which include data blocks having continuous physical addresses among the data blocks,
    wherein the file system is further configured to read the file data by referencing the one or more extents first among the data pointers and the one or more extents, and
    wherein a number of extents included in the node blocks is a predetermined number N or less, where N is a natural number smaller than a number of the data pointers.

12. The host device of claim 11, wherein each of the one or more extents includes offset information indicative of a first block of a corresponding data block group among the data blocks of the file data, a block pointer pointing to the corresponding data block group, and length information of the corresponding data block group.

13. A method for managing data in a computing system, the method comprising:
    creating data blocks storing a file data; and
    creating a node block including data pointers respectively pointing to the data blocks, and one or more extents each indicative of data block groups which include data blocks having continuous physical addresses among the data blocks,
    wherein a number of extents included in the node block is maintained to be a predetermined number N or less, where N is a natural number smaller than or equal to half of a the number of the data pointers.

14. The method of claim 13, wherein the creating of the one or more extents comprises, when a first data block among the data blocks has physical addresses arranged to be continuous to a second data block among the data blocks, allowing the one or more extents included in the node block and pointing to the second data block to group and point to the first data block and the second data block.

15. The method of claim 13, wherein the creating of the one or more extents comprises, when a first data block among the data blocks has physical addresses discontinuous to a second data block among the data blocks and the second data block has physical addresses arranged to be continuous to a third data block among the data blocks, merging a first extent included in the node block and pointing to the second data block with a second extent included in the node block and pointing to the third data block; and
    newly creating an extent pointing to the first data block.

16. The method of claim 13, wherein the creating of the one or more extents comprises, when a first data block among the data blocks has physical addresses discontinuous to a second data block among the data blocks and the second data block has physical addresses discontinuous to a third data block among the data blocks, removing one of a first extent and a second extent, the first extent included in the node block and pointing to the second data block and the second extent included in the node block and pointing to the third data block; and
    newly creating an extent pointing out the first data block.

* * * * *